United States Patent [19]

Henry

[11] 4,255,749
[45] Mar. 10, 1981

[54] APPARATUS FOR CONVERTING CODE SIGNAL TO VISUAL DISPLAY

[76] Inventor: Gary G. Henry, 335 Brooksboro Dr., Webster, N.Y. 14580

[21] Appl. No.: 106,744

[22] Filed: Dec. 26, 1979

[51] Int. Cl.$^3$ ............................................. G08B 5/36
[52] U.S. Cl. ............................. 340/706; 178/26 A; 178/115; 340/347 R; 340/756; 340/804; 434/222; 434/323; 434/335
[58] Field of Search ............. 340/706, 804; 178/26 A, 178/115; 35/6, 14

[56] References Cited

U.S. PATENT DOCUMENTS

| | | | |
|---|---|---|---|
| 2,534,387 | 12/1950 | Thomas et al. ..................... | 178/26 A |
| 3,267,456 | 8/1966 | Morris et al. ....................... | 340/317 |
| 3,727,003 | 4/1973 | Paraskevakos .................. | 340/706 X |

Primary Examiner—David L. Trafton
Attorney, Agent, or Firm—Lawrence P. Kessler

[57] ABSTRACT

Apparatus for converting a train of code signals representative of a letter, number, or symbol to a visual display of such corresponding letter, number, or symbol. The train of signals includes individual signals of at least two distinct time durations, the length of the time durations being dependent upon the proficiency of the operator initiating the signals. In the signal converting apparatus, a clock signal of a preselected time duration is produced. The time relation of each of the signals in the train of signals is resolved in relation to the clock signal. A first signal is produced if the signal being resolved is less than the clock signal, and a second signal is produced if the signal being resolved is greater than the clock signal. An addressor receives the first and second signals and stores the signals to generate a given address dependent upon the particular first and second signals and the order those signals are received. The addressor produces a signal indicative of the given address. A memory contains a respective letter, number, or symbol corresponding to each address. The memory is associated with the addressor for receiving the signal of the given address and producing a signal representative of such respective letter, number, or symbol of the address. A sensor detects the end of the train of signals and produces a signal indicative of the end of the train of signals. A visual display is associated with the memory and the sensor such that the visual display receives signals indicative of the respective letter, number, or symbol of the given address and produces a visual display of the respective letter, number, or symbol when the end of the train of signals is sensed.

12 Claims, 3 Drawing Figures

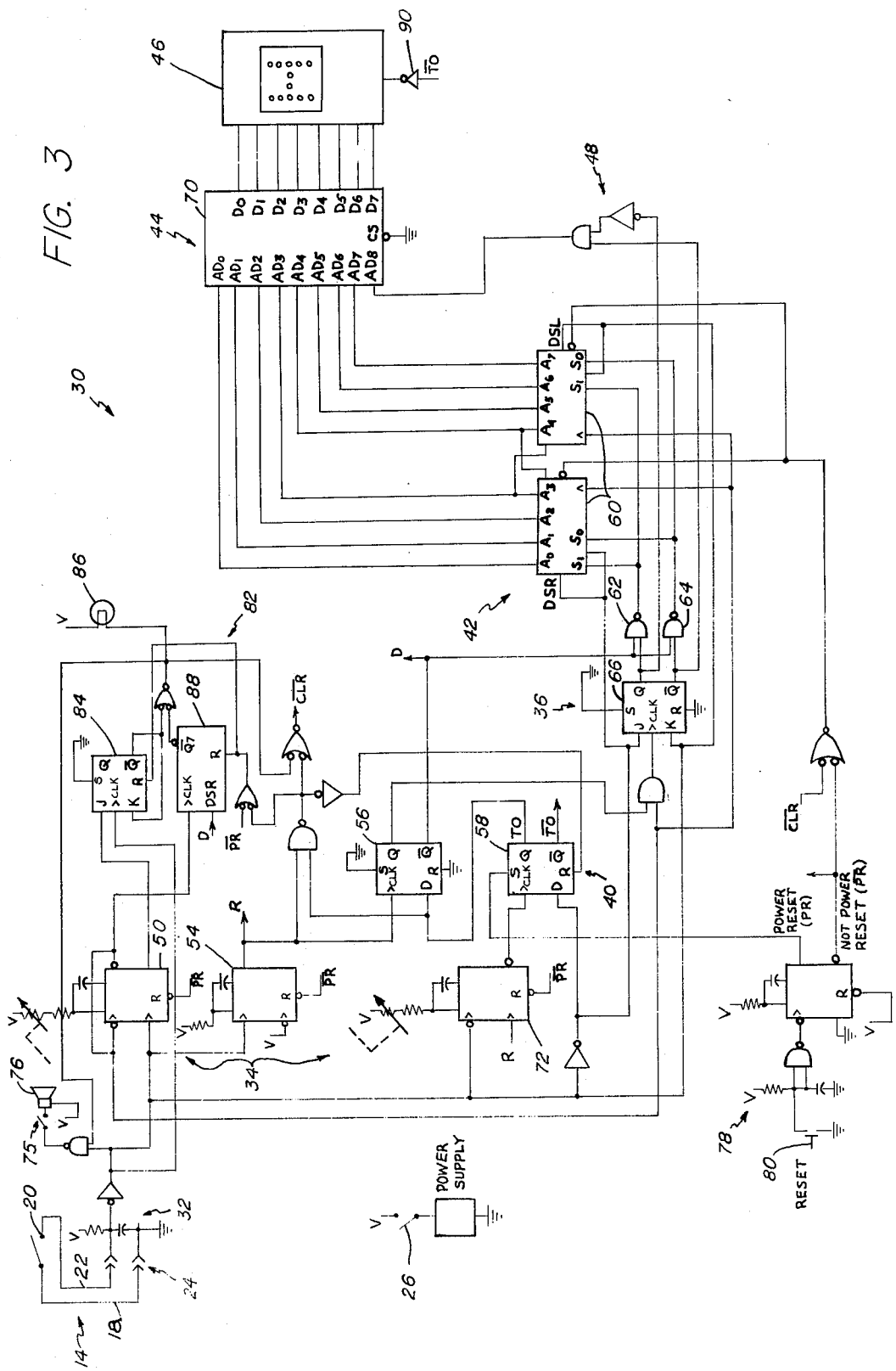

APPARATUS FOR CONVERTING CODE SIGNAL TO VISUAL DISPLAY

BACKGROUND OF THE INVENTION

This invention relates generally to apparatus for converting a manually produced code signal to a visual display, and more particularly to electronic apparatus for converting International Morse Code signals to visual displays of corresponding letters, numbers, or symbols.

The use of coded signals for interpersonal communications has been a well known practice for a long time. For example, before the invention of the telephone or radio, the telegraph, which utilizes International Morse Code signal patterns, was the primary way to communicate over long distances. Even today, the use of Morse Code as a vehicle for sending communications remains popular with amateur radio enthusiasts and hobbiests. To become proficient in communicating with Morse Code, an operator must learn the standardized signal patterns and develop the technique of properly initiating those signal patterns. Operator technique was perfected only through hours of practice with a second party who had to decode the initiated signals. In the past, there was no way that an individual could develop his expertise in sending code signals on his own.

Advances in electronics have enabled apparatus, such as the teletypewriter, to convert electrically generated code signals to a visual display of corresponding letters, numbers, or symbols. However, for manually generated code signals, there has heretofore been no way of discriminating between operator levels of proficiency in sending such code signals. That is, signals generated by a novice with a low degree of proficiency could be misinterpreted with relation to the signals generated by an operator with a high degree of proficiency. For example, the time duration of a Morse Code short signal (dot) produced by a novice may be the same as the time duration of a Morse Code long signal (dash) by a skilled operator.

SUMMARY OF THE INVENTION

This invention is directed to an apparatus for converting a train of code signals representative of a letter, number, or symbol to a visual display of such corresponding letter, number, or symbol. The train of signals includes individual signals of at least two distinct time durations, the length of the time durations being dependent upon the proficiency of the operator initiating the signals. In the signal converting apparatus, a clock signal of a preselected time duration is produced. The time relation of each of the signals in the train of signals is resolved in relation to the clock signal. A first signal is produced if the signal being resolved is less than the clock signal, and a second signal is produced if the signal being resolved is greater than the clock signal. An addressor receives the first and second signals and stores the signals to generate a given address dependent upon the particular first and second signals and the order those signals are received. The addressor produces a signal indicative of the given address. A memory contains a respective letter, number, or symbol corresponding to each address. The memory is associated with the addressor for receiving the signal of the given address and producing a signal representative of such respective letter, number, or symbol of the address. A sensor detects the end of the train of signals and produces a signal indicative of the end of the train of signals. A visual display is associated with the memory and the sensor such that the visual display receives signals indicative of the respective letter, number, or symbol of the given address and produces a visual display of the respective letter, number, or symbol when the end of the train of signals is sensed.

BRIEF DESCRIPTION OF THE DRAWINGS

FIG. 3 is a schematic illustration of the electronic circuit for carrying out the conversion of the train of code signals to the visual display in the apparatus according to this invention.

DESCRIPTION OF THE PREFERRED EMBODIMENT

Figure 1:
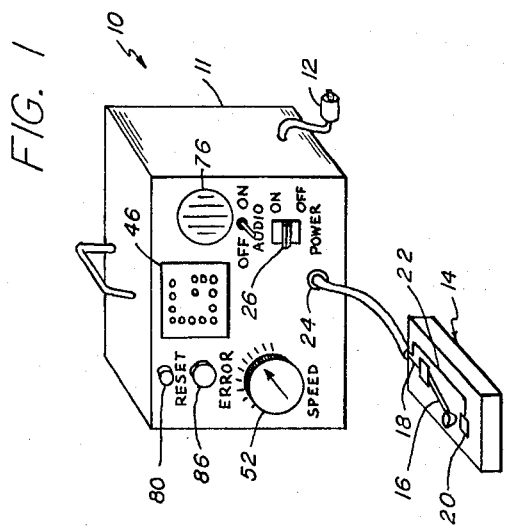
FIG. 1 is a view in perspective of the keyer for producing a train of code signals and the housing of the apparatus for converting the train of code signals to a visual display of a corresponding letter, number, or symbol, according to this invention.

Referring now to the accompanying drawings, FIG. 1 shows an apparatus designated generally by the numeral 10 for converting the train of code signals to a visual display of a corresponding letter, number, or symbol. The apparatus includes a housing 11 having a visual display 46. The display is controlled by an electrical circuit 30, within the housing 11, which can be operated either off an internal electrical potential source (battery) or by connection to a conventional electrical power supply through power cord 12. The code signals are produced by a conventional mechanical keyer 14. Of course, other keyers, such as those of the electromechanical type may be used. The keyer has a key arm 16 connected to a first wire 18 and a contact 20 connected to a second wire 22. The wires 18, 22 are, in turn, connected to the electrical circuit 30 (FIG. 3) by a conventional plug 24. When the potential source is applied to the circuit 30 by turning on switch 26, the keyer 14 can be used to produce a train of code signals which are converted to a visual display of the corresponding letter, number, or symbol by the circuit 30.

When the key arm 16 is depressed, the potential level in the electrical circuit 30 is changed to produce an input signal to the circuit, the time duration of the signal being directly related to the time the key arm is depressed. Input signals are in the form of a train of signals based on a code pattern, such as International Morse Code, for example. As is well known, International Morse Code comprises signals of two distinct time durations placed together in given patterns representing respective letters, numbers, or symbols. Typically, the signals of one time duration, called "dashes," are significantly longer than the signals of the other time duration, called "dots". When the signal patterns (e.g. letters) are transmitted in series to form a message (e.g. a word), the patterns must be separated from one another by a time duration of, for example, at least three times the time duration of a dot in order to distinguish between patterns. As noted above, the length of the two distinct time durations of the code signals, while remaining in the same basic relationship, may vary widely depending on the proficiency of the operator generating the code signals. Therefore, the electronic circuit 30 of this invention is capable of differentiating between the distinct time duration code signals over a variety of durations.

Figure 2:
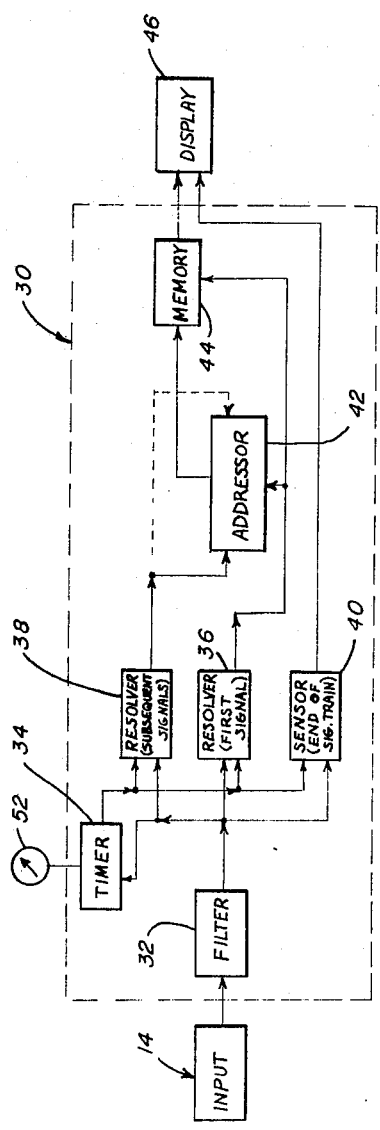
FIG. 2 is a block diagram functionally illustrating the conversion of the train of code signals to the visual display according to this invention.

The electronic circuit 30 functionally represented in FIG. 2, receives the train of input code signals from the keyer 14 and passes the signals through a filter 32 to suppress high frequency noise. An adjustable timer 34, preset by the operator according to his proficiency, produces the signals of a duration between the operator's "dash" signal and "dot" signal, and the end of the code signal train for each signal in the train. Such time signals are inputted to a first signal resolver 36, a subsequent signal resolver 38, and an end of code signal train sensor 40. The first signal of the train is fed to the resolver 36 where, based on the time signal, a determination is made as to whether such signal is a "dot" or a "dash," and an appropriate signal of such determination is produced. The signal from resolver 36 is fed to an addressor 42 of the universal, bidirectional shift register type. The addressor 42 is loaded with the signal from the resolver 36 and also has its shift direction determined thereby. Subsequent signals of the train are fed to the resolver 38 where, similarly, determination is made as to whether such signals are "dots" or "dashes". Appropriate signals of such determinations are produced and sequentially loaded in the addressor 42 in the determined direction. This bidirectional loading of the addressor 42 enables addresses to be given to each standard code signal train corresponding to a letter, number, or symbol in the manner described below.

A memory device 44 such as a Read Only Memory (ROM) contains the corresponding letter, number, or symbol for each address. The memory device receives a signal of the given address in the addressor 42 and delivers a signal of the corresponding letter, number, or symbol to the normally blanked out visual display 46 located in the housing of the apparatus 10 (see FIG. 1). If the memory device has separate fields for addresses based on the direction the addressor is loaded, the device receives a signal from the resolver 36 indicative of the shift direction. If a signal of the train is not received by the sensor 40 during the time signal fed thereto by the timer 34, then the sensor determines that the end of the signal train has occurred. When the sensor 40 makes such determination, a signal is sent to the visual display 46 to activate the display so that the appropriate letter, number, or symbol is displayed.

A particular arrangement for the electronic circuit 30 of the apparatus 10 is schematically illustrated in FIG. 3. The filter 32 of the circuit 30 includes an RC network connected to the wires 18 and 22, so that input code signals generated by depressing the keyer 14 are passed through filter 32 to suppress high frequency noise, caused for example by keyer bounce, with a minimum of time distortion. An internal potential source connected to the RC network provides a normally high level signal which goes low when the keyer 14 is depressed to generate the input code signals. The filtered input code signals (low level signals) are inverted and delivered to the adjustable timer 34 and the first signal resolver 36.

The adjustable timer 34 includes a first clock pulse generator 50. The clock pulse generator 50 is, for example, a monostable multivibrator connected to a linear potentiometer which produces a clock pulse signal of variable time duration. The length of the pulse signal is dependent upon the setting of the linear potentiometer. An adjustment knob 52, mounted on the housing of the apparatus 10 (see FIG. 1), is connected to the linear potentiometer in any well known manner to control the setting of the potentiometer. The time duration for the clock pulse is preset by operator selection of the position of the knob 52, so as to be of a particular duration dependent upon the proficiency of the operator. That is, the clock pulse time duration is selected to be between the time duration of a "dot" signal and the time duration of a "dash" signal as typically produced by the particular operator so as to enable differentiation to be made between the "dot" and "dash" code signals.

In order to accomplish such differentiation, the first input signal produced by depression of the keyer, is delivered to the clock generator 50 and initiates the production of the clock pulse signal of the preset time duration. The lead edge of the input signal also triggers a monostable multivibrator 54 to produce a one microsecond pulse. This pulse clears the addressor 42, clocks a first D flip-flop 56, and resets a second D flip-flop 58, the Q output of which is connected to the D input of flip-flop 56. The addressor 42 is an initially zeroed, universal eight bit bidirectional shift register 60. The clocking of the flip-flop 56 causes NAND gates 62, 64 to force the $S_1$ and $S_o$ inputs to the shift register 60 to high ("ones"). This in turn causes the shift register to go to the parallel load mode. When the end of the clock pulse signal occurs, the shift register receives the input signal at the least significant bit ($A_7$) and an inverted signal at the most significant bit ($A_o$). If the input signal is a "dot," the most significant bit receives a high signal and is stored as a "one" and the least significant bit receives a low signal and is stored as a "zero;" conversely, if the input signal is a "dash," the most significant bit receives a low signal and is stored as a "zero," and the least significant bit receives a high signal and is stored as a "one."

Clocking of the flip-flop 56 also enables the clock input to a JK flip-flop 66. The JK flip-flop 66 receives the input signal at the K input, an inverted input signal at the J input, and the clock pulse signal from the clock generator 50. If the state of the flip-flop 66 remains the same at the end of the clock pulse signal, the input signal is determined to be a "dash;" and if the state of the flip-flop 66 has been set at the end of the clock pulse signal, the input signal is determined to be a "dot." The characteristic equation of the flip-flop 66 is such that when the signal at the J input is high (a "dot" signal has occurred), the Q output is high and the $\overline{Q}$ output is low; and when the signal at the J input is low (a "dash" signal has occurred), the Q output is low and the $\overline{Q}$ output is high. The Q, $\overline{Q}$ outputs of the JK flip-flop 66 are connected to the NAND gates 62, 64 respectively, so that the shift direction for subsequent input signals is set. That is, if the first input signal was a "dot," the $S_1$ input is low and the $S_o$ input is high, and the new input signal will be entered from the DSR input and the first signal shifted right; and if the first input signal was a "dash," the $S_1$ input is high and the $S_o$ input is low, and the new input signal will be entered from the DSL input and the first signal shifted left. On the second and subsequent input signals, the flip-flop 56 is clocked enabling the shift direction, established by the NAND gates 62, 64 and inhibiting the flip-flop 66 from further clocking.

Accordingly, subsequent input signals of the code train trigger the generator 50 and at the end of the clock pulse signal from the generator, the subsequent input signals are loaded into and stored in the shift register 60 in the set direction. Thus, if the first input signal was a "dot", the shift register 60 is loaded from the DSR input with all "dots" being stored as "ones" and "dashes" as "zeroes;" and if the first input signal was a "dash", the shift register is loaded from the DSL input with all "dashes" being stored as "ones" and "dots" as "zeroes." The following chart depicts how a "dot" leading code signal train is loaded in the shift register from the DSR input, and the "dash" leading code signal train is entered from the DSL input:

| Letter/Character/Symbol | Code Signal Train | Address 01234567 |
|---|---|---|
| A | dot, dash ( . - ) | 01000000 |
| N | dash, dot ( . - ) | 00000010 |

The shift register 60 is connected to the memory 44, such as a 4K bit (512×8) ROM 70 for example. The ROM 70 provides two separate memory fields. One memory field contains numbers, letters, and symbols corresponding to addresses of valid "dot" leading signal patterns, while the other memory field contains numbers, letters, and symbols corresponding to addresses of valid "dash" leading signal patterns. One bit (eg. AD8) of the ROM 70 is connected to a shift direction decoder 48 which is in turn connected to the Q, $\overline{Q}$ outputs of the JK flip-flop 66. The decoder 48 determines the shift direction (i.e., whether the first signal in the signal train is a "dot" or a "dash") depending on the output of the flip-flop 66 and correspondingly selects the memory field to receive the address signal from the shift register 60. The ROM translates the received addresses of the International Morse Code signal patterns into a seven bit ASCII (American Standard Code for Information Interchange) code for the display 46, representing respective letters, numbers, or symbols. Of course, conversion of other code signal patterns to corresponding visual display may be accomplished by substituting an appropriate ROM in the memory 44.

The memory 44 is constantly receiving signals from the shift register as the code signal train is being produced by selective depression of the keyer 14. Such signals are translated by the memory 44 and appropriate corresponding signals are delivered to the visual display 46. The display output may be, for example, a Dialight 740–0018 Alpha-Numeric apparatus manufactured by Dialight Corporation of Brooklyn, New York. The visual display 46 is normally blanked out. This blanking is desirable since the display output is continuously receiving signals as the code signal train is produced, and would otherwise be flashing intermediate letters, numbers, or symbols until the signal train is completed. Therefore, it is necessary to provide the end of code signal train sensor 40 to enable the display 46 to be utilized to visually display only the proper letter, number, or symbol corresponding to the particular code signal train produced. Sensor 40 utilizes a second clock pulse generator 72 of timer 34. The clock pulse generator 72 is, for example, a retriggerable monostable multivibrator connected to a linear potentiometer. The linear potentiometer of generator 72 is ganged with the linear potentiometer of the first clock pulse generator 50 and is therefore similarly controlled in its setting by adjustment knob 52. As noted above, the average time duration between trains of code signals for different numbers, letters, or symbols is ideally three times the time duration of a "dot" signal. Therefore, the generator 72 is selected so that the time duration of the clock pulse produced thereby is always related to the clock pulse produced by generator 50 in the ratio of 3 to 1.

When the operator depresses the keyer 14 to produce an input code signal, a signal is sent to the clock pulse generator 72 to initiate the production of its clock pulse signal; and when the keyer is released, the generator is retriggered. The retriggerable clock pulse is utilized to clock the flip-flop 58, which also receives an inverted input signal. If the keyer 14 has not been re-depressed by the end of the time duration of the clock pulse at the flip flop 58, then the end of the code signal train is determined to have occurred; if the keyer has been re-depressed, it is determined that the end of the train has not yet occurred. Particularly, if the keyer 14 has been re-depressed before the flip-flop 58 is clocked, the Q output is low and the $\overline{Q}$ output connected to an inverter 90 is high to blank out the display 46; but if the keyer has not been depressed, the Q output is high and the $\overline{Q}$ output is low. This low signal enables the visual display 46 to display the respective letter, number, or symbol in the memory 70 for the particular unique address at the shift register at that point in time. The operator thus receives an immediate visual indication of the actual code signal inputted at the keyer and can compare this with the signal he intended to produce. Further, by adjusting the time duration of the clock pulses, the operator can challenge himself to produce code signals faster and more accurately.

The circuit 30 may include an audio device 75 for producing a sound output equivalent in duration to the input signals produced by depressing the keyer. The audio device 75 includes a speaker 76 mounted in the apparatus housing 11 (see FIG. 1), and may be, for example, a Sonalert Model SC628, manufactured by Mallory of Indianapolis, Indiana. Further, to insure that the components of the circuit 30 are initiallized when first powered up, a reset device 78 is employed. The reset device 78 includes a monostable multivibrator for producing a pulse signal connected to the shift register 60 and flip-flop 58 to clear the shift register and set the flip-flop when first powered up. The reset device may also be manually triggered by a button 80 located on the housing of the apparatus 10 (see FIG. 1) at the desire of the operator. Additionally, the circuit 30 may include logic for detection of errors generated by too rapidly keying the keyer 14 (i.e., input signal produced before resolution of previous input signal), or keying in too many input signals in a code train. The error detection logic designated generally by the numeral 82, includes a JK flip-flop 84 clocked by the input signal. The J input is connected to the clock pulse generator 50 and the K input is connected to the $\overline{Q}$ output so that the flip-flop functions in the toggle mode. Thus, if the flip-flop is clocked before the previous input signal is resolved (i.e., before the end of the pulse from generator 50), the state of flip-flop changes and a signal from the $\overline{Q}$ output turns on a light 86, inhibits the operation of the audio device 75, and clears addressor 60. Operation of the light 86 mounted in the housing of the apparatus 10 (FIG. 1) gives a visual indication of the detection of an error. In this instance, the operator is depressing key 14 too rapidly for the operator-set clock pulses; and such setting should be adjusted accordingly by knob 52. Further, a shift register 88 is connected to the clock pulse generator and counts the number of input signals until the end of the train of signals is sensed. If the count exceeds eight, the signal train is improperly generated in that it has too many components. Accordingly, a signal is produced which turns on light 86, inhibits operation of the audio device 75, and clears addressor 60. After time out, the start of a new code train automatically resets the flip-flop 84 and register 88 so that any similar errors in the subsequent train can be detected.

The invention has been described in detail with particular reference to preferred embodiment thereof, but will be understood that variations and modifications can be issued within the spirit and scope of the invention as claimed.

I claim:

1. Apparatus for converting a train of signals representative of a code corresponding to a letter, number, or symbol to a visual display of such corresponding letter, number, or symbol, said train of signals being made up of individual signals of at least two distinct time durations, said apparatus comprising:
   means for producing a clock signal of a preselected time duration for each individual signal in said train of signals;
   means for resolving the time relation of each of said individual signals in the train of signals to said clock signal, said resolving means including means for producing a first signal if said signal being resolved is less than said clock signal, and a second signal if said signal being resolved is greater than said clock signal;
   addressor means for receiving said first and second signals produced by said resolving means and storing said signals to generate a given address dependent upon the particular signals and the order said signals are received, said addressor means producing a signal representative of said given address;
   memory means containing a respective letter, number, or symbol corresponding to each address of said addressor means and receiving said signal from said addressor means representative of said given address, said memory means producing a signal representative of such respective letter, number, or symbol of said given address;
   sensing means for sensing the end of the train of signals and producing a signal indicative of the end of the train of signals; and
   display means associated with said memory means and said sensing means for receiving said signal representative of said respective letter, number, or symbol and said signal from said sensing means and producing a visual display of said respective letter, number, or symbol when said sensing means senses the end of said train of signals.

2. The invention of claim 1 wherein said clock signal producing means includes means for producing a clock signal of variable time duration, and means for selecting a clock signal of particular time duration from said variable time duration clock signal producing means.

3. The invention of claim 1 further including means for converting said individual signals in said signal train to a given electrical potential level signal, for the duration of time of such individual signal, from a different electrical potential level.

4. The invention of claim 3 wherein said sensing means includes: means for producing a second clock signal of a time duration greater than said clock signal of preselected time duration when said given level signal is produced; means for receiving said second clock signal and said given level signals; said receiving means producing a signal indicative of the end of a train of signals if a given level signal is not received by the end of said second clock signal.

5. The invention of claim 4 wherein said second clock signal producing means produces a signal of a time duration equal to at least three times the time duration of said clock signal of preselected time duration.

6. The invention of claim 3 further including: means associated with said signal converting means for procucing an audio signal corresponding in time duration to any given level signal; and means for detecting errors in such train of signals and producing a signal when an error is detected, for inhibiting said audio signal clearing said given address from said addressor means, and producing a visual indication that an error has been detected.

7. The invention of claim 6 wherein said error detecting means is associated with said sensing means and said signal converting means whereby, after the end of a train of signals is sensed by said sensing means, when said converting means receives a subsequent individual signal, said error detecting means is reset.

8. The invention of claim 1 wherein said addressor means is a universal bidirectional shift register, and wherein said resolving means includes means for resolving the time relation of the first signal in said train of signals and producing a signal to set the shift direction of said shift register.

9. The invention of claim 8 wherein said resolving means further includes means for parallel loading said shift register with said signal from said first signal resolving means; second signal resolving means for determining the time relation of subsequent signals in said train of signals and producing signals representative of such determination; and means for loading said shift register with said last mentioned signals in the direction set by said first signal resolving means.

10. Apparatus for converting an International Morse Code signal pattern representative of a letter, number, or symbol to a visual display of such letter, number, or symbol, said signal pattern being made up of individual dot and dash signals, said dash signals being of a dime duration substantially longer than the time duration of said dot signals, said apparatus comprising:
   means for producing a first adjustable time length clock signal for each individual signal of said signal pattern, said first clock signal being preset to be of a time duration between that of said dot and dash signals;
   first resolving means for resolving the time relation of the first signal of said individual dot and dash signals of said signal pattern to said first clock signal, said first resolving means producing a first signal representative of said first individual signal being a dot signal, and producing a second signal representative of said first individual signal being a dash signal;
   second resolving means for resolving the time relation of subsequent signals of said individual dot and dash signals of said signal pattern to said first clock signal, said second resolving means producing first signals representative of said subsequent signals being dot signals, and second signals representative of said subsequent signals being dash signals;
   a universal bidirectional shift register associated with said first and second resolving means for receiving said first or second signal from said first resolving means to load said first or second signal in said shift register and to set the direction that said shift register will shift upon receiving said first and second signals from said second resolving means, and receiving said first and second signals from said second resolving means to generate a given address dependent upon said first and second signals and the order in which they are received, said shift register producing a signal representative of said given address;

memory means for containing a respective letter, number, or symbol corresponding to each address of said addressor means and receiving said signal from said shift register of said given address, said memory means producing a signal representative of such respective letter, number, or symbol of said given address;

means for sensing the end of said signal pattern including means for producing a second adjustable time length clock signal for each individual signal of said signal pattern, said second clock signal being preset to be of a time relation substantially greater than said first clock signal, means for receiving said second clock signal and said signals of said signal pattern, said receiving means producing a signal indicative of the end of said signal pattern when no signal from said signal pattern is received by the end of said second clock signal; and display means, associated with said memory means and said sensing means, for receiving said signal representative of said respective letter, number, and said signal from said receiving means and producing a visual display of said respective letter, number, or symbol when said sensing means senses the end of said signal pattern.

11. The invention of claim 10 wherein said second clock signal is of a time duration substantially equal to three times the time duration of said first clock signal.

12. The invention of claim 11 further including means associated with said bidirectional shift register for setting the level of said first and second signals produced by said first and second resolving means to first and second levels dependent upon said first individual signal of said signal pattern, whereby when said first individual signal is resolved by said first resolving means to be of a time duration less than said first clock signal, said signal representative of said first individual signal and all signals of like time duration are entered into said shift register in one direction at said first level and all signals representative of said other time duration enter said shift register in said one direction at said second level and when the said first individual signal is resolved by said first resolving means to be of a time duration greater than said first clock signal, said signal representative of said first signal and all signals of like time duration are entered into said shift register in the opposite direction at said first level, and all signals representative of said other time duration enter said shift register in said opposite direction at said second level.

* * * * *